(12) United States Patent
Wang et al.

(10) Patent No.: US 12,491,345 B2
(45) Date of Patent: Dec. 9, 2025

(54) TEMPORARY PACING GUIDEWIRE

(71) Applicant: Greatbatch Ltd., Clarence, NY (US)

(72) Inventors: Ling Wang, Plymouth, MN (US);
David Thomsen, Delano, MN (US);
Jeremy Hansen, Eden Prairie, MN (US)

(73) Assignee: Greatbatch Ltd., Clarence, NY (US)

( * ) Notice: Subject to any disclaimer, the term of this patent is extended or adjusted under 35 U.S.C. 154(b) by 288 days.

(21) Appl. No.: 18/236,014

(22) Filed: Aug. 21, 2023

(65) Prior Publication Data

US 2024/0058585 A1 Feb. 22, 2024

Related U.S. Application Data

(60) Provisional application No. 63/446,370, filed on Feb. 17, 2023, provisional application No. 63/404,995, filed on Sep. 9, 2022, provisional application No. 63/399,285, filed on Aug. 19, 2022.

(51) Int. Cl.
*A61M 25/09* (2006.01)
*A61N 1/05* (2006.01)

(52) U.S. Cl.
CPC .............. *A61M 25/09* (2013.01); *A61N 1/056* (2013.01); *A61N 1/0595* (2013.01); *A61M 2025/09083* (2013.01)

(58) Field of Classification Search
None
See application file for complete search history.

(56) References Cited

U.S. PATENT DOCUMENTS

| | | |
|---|---|---|
| 4,402,328 A | 9/1983 | Doring |
| 4,402,330 A | 9/1983 | Lindemans |
| 4,454,888 A | 6/1984 | Gold |
| 4,917,104 A | 4/1990 | Rebell |
| 5,007,435 A | 4/1991 | Doan et al. |
| 5,324,327 A | 6/1994 | Cohen |

(Continued)

FOREIGN PATENT DOCUMENTS

| | | |
|---|---|---|
| CN | 202289222 U | 7/2012 |
| CN | 212730714 U | 3/2021 |

OTHER PUBLICATIONS

Cull, Benjamin, "Mechanical Properties of the Heart", Part 1: Clinical and Laboratory Data Analysis of Perforation Behavior of Pacemaker and Defibrillator Leads, Dec. 2007.

(Continued)

*Primary Examiner* — Michael W Kahelin
(74) *Attorney, Agent, or Firm* — Michael P. Horvath

(57) ABSTRACT

In various examples, a guidewire for temporary pacing of tissue includes an elongate core wire and a coil disposed along at least a portion of a length of the core wire. The coil is disposed radially outwardly from and around the core wire, wherein a core axis and a coil axis are substantially aligned. At least one electrode is disposed along the guidewire and includes an uninsulated portion of the core wire disposed within an electrode section of the coil. A spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

20 Claims, 7 Drawing Sheets

(56) References Cited

U.S. PATENT DOCUMENTS

| | | |
|---|---|---|
| 5,582,609 A | 12/1996 | Swanson et al. |
| 5,674,273 A | 10/1997 | Helland |
| 6,059,779 A | 5/2000 | Mills |
| 6,494,894 B2 | 12/2002 | Mirarchi |
| 6,671,553 B1 | 12/2003 | Helland et al. |
| 7,130,699 B2 | 10/2006 | Huff et al. |
| 7,272,448 B1 | 9/2007 | Morgan et al. |
| 7,283,878 B2 | 10/2007 | Brostrom et al. |
| 7,627,382 B2 | 12/2009 | Minar et al. |
| 7,946,999 B2 | 5/2011 | Rooney et al. |
| 8,121,687 B2 | 2/2012 | Jensen et al. |
| 8,244,352 B2 | 8/2012 | Eidenschink et al. |
| 8,442,657 B2 | 5/2013 | Foster |
| 8,452,419 B2 | 5/2013 | Santamore et al. |
| 8,666,513 B2 | 3/2014 | Ameri et al. |
| 8,731,685 B2 | 5/2014 | Ameri |
| 9,020,609 B2 | 4/2015 | Fan et al. |
| 9,031,647 B2 | 5/2015 | Maskara et al. |
| 9,333,341 B2 | 5/2016 | Sommer et al. |
| 9,387,323 B2 * | 7/2016 | Fleischhacker ........ A61N 1/056 |
| 9,931,375 B2 | 4/2018 | Santamore et al. |
| 10,806,932 B2 | 10/2020 | Koop et al. |
| 10,881,851 B2 | 1/2021 | Daniels et al. |
| 11,266,840 B2 | 3/2022 | Chae |
| 11,400,262 B2 | 8/2022 | Kobayashi et al. |
| 11,420,046 B2 | 8/2022 | Daniels et al. |
| 2004/0024425 A1 | 2/2004 | Worley et al. |
| 2008/0148550 A1 | 6/2008 | Bischoff et al. |
| 2018/0000540 A1 | 1/2018 | Ogle et al. |
| 2018/0133463 A1 | 5/2018 | Reddy |
| 2021/0052860 A1 | 2/2021 | Alsheikh |
| 2022/0032042 A1 | 2/2022 | Whitman et al. |
| 2022/0111182 A1 | 4/2022 | Patil et al. |

OTHER PUBLICATIONS

Heinroth, Konstatin M., et al., "Transcoronary pacing in an animal model", Second coated guidewire versus cutaneous patch as indifferent electrodes, Apr. 2022, 117 (3): 227-234.

Mixon, Timothy, MD, et al., "Temporary coronary guidewire pacing during percutaneous coronary intervension", Catheterization & Cardiovascular Intervention; vol. 61, Issue 4, Apr. 2004, 494-500.

* cited by examiner

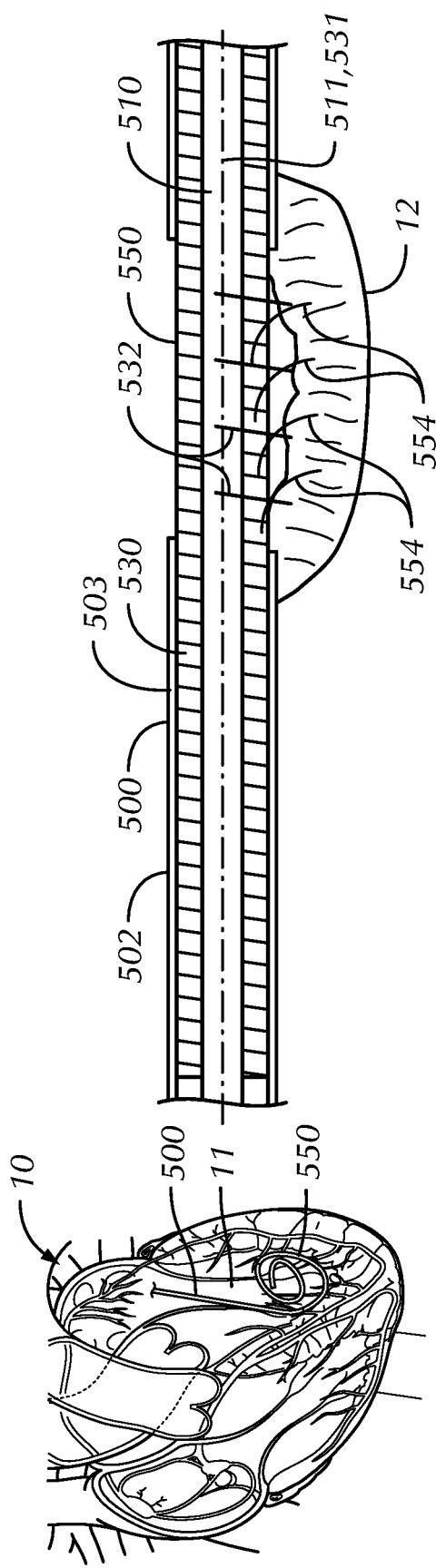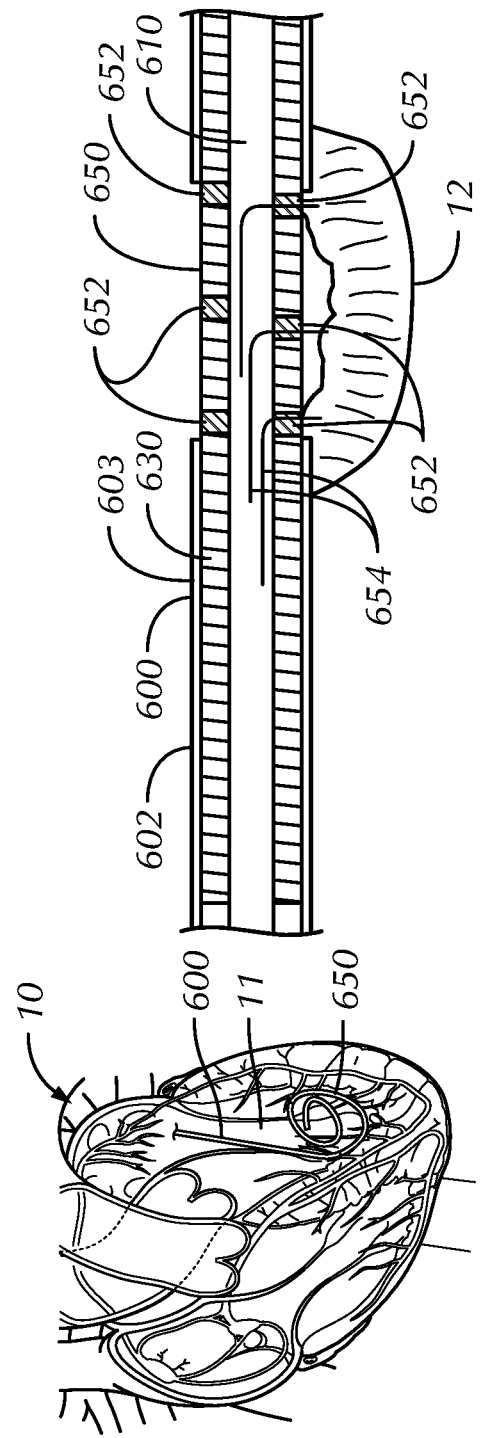
FIG. 5
FIG. 6

TEMPORARY PACING GUIDEWIRE

CROSS REFERENCE TO RELATED APPLICATIONS

This application claims the benefit of priority to U.S. Provisional Application Ser. No. 63/399,285, filed on Aug. 19, 2022, entitled "METHOD OF MAKING LOW ELECTRIC RESISTANCE PACING GUIDEWIRE"; U.S. Provisional Application Ser. No. 63/404,995, filed on Sep. 9, 2022, entitled "WAY OF MAKING TEMPORARY PACING GUIDEWIRE ELECTRODE"; and U.S. Provisional Application Ser. No. 63/446,370, filed on Feb. 17, 2023, entitled "TEMPORARY PACING GUIDEWIRE PROXIMAL END CONNECTOR WITH INSULATION RING," each of which is incorporated by reference herein in its entirety.

BACKGROUND

Physicians have tried using conventional guidewires for temporary pacing in various surgical procedures (such as transcatheter aortic valve replacement (TAVR), transcatheter aortic valve implantation (TAVI), and balloon aortic valvuloplasty (BAV), to name a few), and the pacing results have been inconsistent. Such inconsistent pacing can occur for various reasons. For instance, inconsistent pacing can occur because an electrode, typically located at a distal tip of the conventional guidewire, does not always touch, or otherwise get close enough to, a heart pacing path and, therefore, cannot consistently excite a heart conducting nerve. Inconsistent pacing can also result from high system impedance due to the construction of the conventional guidewire which can lead to pacing energy being lost within the guidewire body and/or insufficient electrical contact of an external stimulation device with a proximal end of the conventional guidewire, which can result in little to no electrical current being conducted to the guidewire from the external stimulation device. What is needed is a guidewire that can provide more reliable temporary pacing in order to facilitate more favorable clinical outcomes.

OVERVIEW

This overview is intended to provide an overview of subject matter of the present patent document. It is not intended to provide an exclusive or exhaustive explanation of the invention. The detailed description is included to provide further information about the present patent document.

The present inventors have recognized, among other things, that the present subject matter can be used to provide a guidewire for consistent temporary stimulation of tissue, such as, but not limited to, temporary pacing of cardiac tissue. In various examples, the present subject matter is advantageous in that it provides a guidewire with multiple electrodes to allow for at least one electrode to touch, or otherwise get close enough to, a heart pacing path and, therefore, consistently excite a heart conducting nerve. Also, the present subject matter is advantageous in that it allows for a guidewire that can provide a consistent and relatively low impedance pathway between an external stimulation device. The present subject matter can be used to provide a guidewire that can allow for more reliable temporary pacing in order to facilitate more favorable clinical outcomes. To better illustrate the devices described herein, a non-limiting list of examples is provided here:

Example 1 can include subject matter that can include a guidewire for temporary pacing of tissue. The guidewire includes a guidewire proximal end, a guidewire distal end, and a guidewire length extending from the guidewire proximal end to the guidewire distal end. The guidewire includes an elongate core wire. The core wire includes a core proximal end, a core distal end, and a core length extending from the core proximal end to the core distal end. The core wire includes a core axis along the length of the core wire. A coil is disposed along at least a portion of the length of the core wire. The coil includes a coil length and a coil axis along the length of the coil. The coil includes a first pitch along at least some of the length of the coil. The coil is disposed radially outwardly from and around the core wire, wherein the core axis and the coil axis are substantially aligned. At least one electrode is disposed along the guidewire. The at least one electrode includes an uninsulated portion of the core wire disposed within an electrode section of the coil. The electrode section of the coil includes a second pitch, wherein the second pitch is greater than the first pitch, such that a spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

In Example 2, the subject matter of Example 1 is optionally configured such that the core wire includes insulation along at least a portion of the core wire other than the uninsulated portion.

In Example 3, the subject matter of Example 2 is optionally configured such that the core wire is insulated along the length of the core wire except at the uninsulated portion of the core wire disposed at a location of the at least one electrode.

In Example 4, the subject matter of any one of Examples 1-3 is optionally configured such that the coil of the electrode section having the second pitch includes a distance between adjacent windings of the coil that is greater than a distance between adjacent windings of the coil having the first pitch.

In Example 5, the subject matter of any one of Examples 1-4 is optionally configured such that the guidewire includes a J-shaped portion proximate the guidewire distal end.

In Example 6, the subject matter of Example 5 is optionally configured such that the at least one electrode is located on the J-shaped portion.

In Example 7, the subject matter of any one of Examples 1-6 is optionally configured such that the at least one electrode includes two or more electrodes.

In Example 8, the subject matter of any one of Examples 1-7 is optionally configured such that the coil can include a coating around at least part of the coil.

In Example 9, the subject matter of any one of Examples 1-8 is optionally configured such that the at least one electrode includes at least one weld between the uninsulated portion of the core wire and the electrode section of the coil to create a lower-resistance path to stimulate the tissue.

In Example 10, the subject matter of any one of Examples 1-9 is optionally configured such that the guidewire proximal end includes a connector configured to electrically couple an external stimulation device to the core wire. The external stimulation device is configured to provide the stimulation pulse to be delivered by the at least one electrode in order to stimulate the tissue.

In Example 11, the subject matter of Example 10 is optionally configured such that the connector includes the core proximal end extending from within the guidewire, at least a portion of the core proximal end being uninsulated.

In Example 12, the subject matter of Example 11 is optionally configured such that the connector includes an insulation ring electrically insulating the coil from the core proximal end.

Example 13 can include, or can optionally be combined with any one of Examples 1-12 to include subject matter that can include a guidewire for temporary pacing of tissue. The guidewire includes a guidewire proximal end, a guidewire distal end, and a guidewire length extending from the guidewire proximal end to the guidewire distal end. The guidewire includes an elongate core wire. The core wire includes a core proximal end, a core distal end, and a core length extending from the core proximal end to the core distal end. The core wire includes a core axis along the length of the core wire. A coil is disposed along at least a portion of the length of the core wire. The coil includes a coil length and a coil axis along the length of the coil. The coil includes a first pitch along at least some of the length of the coil. The coil is disposed radially outwardly from and around the core wire, wherein the core axis and the coil axis are substantially aligned. At least one electrode is disposed along the guidewire. The at least one electrode includes an uninsulated portion of the core wire disposed within an electrode section of the coil. The electrode section of the coil includes a second pitch greater than the first pitch, wherein the coil of the electrode section having the second pitch includes a distance between adjacent windings of the coil that is greater than a distance between adjacent windings of the coil having the first pitch, such that a spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

In Example 14, the subject matter of Example 13 is optionally configured such that the core wire includes insulation along at least a portion of the core wire. The core wire at least is uninsulated at the uninsulated portion of the core wire disposed at a location of the at least one electrode.

In Example 15, the subject matter of Example 13 or Example 14 is optionally configured such that the at least one electrode includes two or more electrodes.

In Example 16, the subject matter of any one of Examples 13-15 is optionally configured such that the at least one electrode includes at least one weld between the uninsulated portion of the core wire and the electrode section of the coil to create a lower-resistance path to stimulate the tissue.

In Example 17, the subject matter of any one of Examples 13-16 is optionally configured such that the guidewire proximal end includes a connector configured to electrically couple an external stimulation device to the core wire. The external stimulation device is configured to provide the stimulation pulse to be delivered by the at least one electrode in order to stimulate the tissue.

In Example 18, the subject matter of Example 17 is optionally configured such that the connector includes the core proximal end extending from within the guidewire. At least a portion of the core proximal end is uninsulated. An insulation ring electrically insulates the coil from the core proximal end.

Example 19 can include, or can optionally be combined with any one of Examples 1-18 to include subject matter that can include a guidewire for temporary pacing of tissue. The guidewire includes a guidewire proximal end, a guidewire distal end, and a guidewire length extending from the guidewire proximal end to the guidewire distal end. The guidewire includes an elongate core wire. The core wire includes a core proximal end, a core distal end, and a core length extending from the core proximal end to the core distal end. The core wire includes a core axis along the length of the core wire, wherein the core wire includes insulation along at least a portion of the core wire. A coil is disposed along at least a portion of the length of the core wire. The coil includes a coil length and a coil axis along the length of the coil. The coil includes a first pitch along at least some of the length of the coil. The coil is disposed radially outwardly from and around the core wire, wherein the core axis and the coil axis are substantially aligned. Two or more electrodes are disposed along the guidewire. Each of the electrodes includes an uninsulated portion of the core wire disposed within an electrode section of the coil. The electrode section of the coil includes a second pitch greater than the first pitch. The coil of the electrode section has the second pitch including a distance between adjacent windings of the coil that is greater than a distance between adjacent windings of the coil having the first pitch, such that a spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

In Example 20, the subject matter of Example 19 is optionally configured such that each of the two or more electrodes includes at least one weld between the uninsulated portion of the core wire and the electrode section of the coil to create a lower-resistance path to stimulate the tissue.

BRIEF DESCRIPTION OF THE DRAWINGS

FIG. 5 is a cross-sectional view of a heart having a guidewire in accordance with at least one example of the invention disposed within the heart, as well as an enlarged cross-sectional view of an electrode of the guidewire.

FIG. 6 is a cross-sectional view of a heart having a guidewire in accordance with at least one example of the invention disposed within the heart, as well as an enlarged cross-sectional view of an electrode of the guidewire.

DETAILED DESCRIPTION

Figure 1:
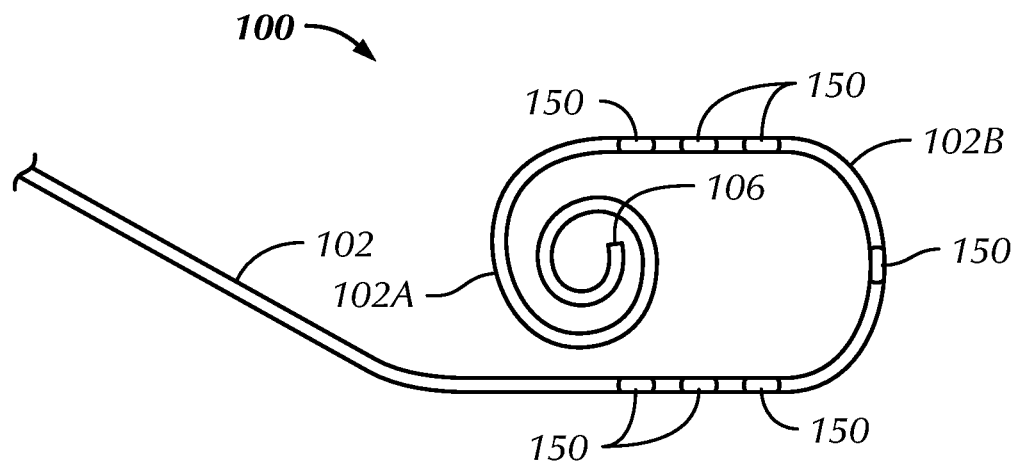
FIG. 1 is a side view of a guidewire in accordance with at least one example of the invention.

The present invention relates generally to a guidewire. More specifically, the present invention relates to a guidewire that can be used for consistent temporary stimulation of tissue, such as, but not limited to, consistent temporary pacing of cardiac tissue. In some examples, the present subject matter provides a guidewire for temporary pacing that can be used in various surgical procedures, such as transcatheter aortic valve replacement (TAVR), transcatheter aortic valve implantation (TAVI), and balloon aortic valvuloplasty (BAV). However, the present subject matter is not intended to be so limited. As such, it is contemplated herein that the present subject matter can be used in various other surgical procedures and/or in various other situations.

In some examples, the present inventive subject matter improves the temporary pacing outcome, in that it enables temporary pacing and provides for safe and efficient pacing with a low pacing threshold. In some examples, the present inventive subject matter enables temporary pacing, allowing physicians to use the guidewire as a pacing wire, which can simplify surgical procedures. In some examples, the present inventive subject matter provides for safe and efficient pacing with a low and consistent pacing threshold, allowing physicians to pace a patient's heart efficiently with minimum electrode energy, thereby further improving patient pacing safety. In some examples, the one or more pacing electrodes of the present inventive subject matter can touch the heart septal wall and be close to the heart pacing path to allow the one or more electrodes to excite the HIS bundle, left bundle, and/or Purkinje fibers of the heart for efficient pacing.

In some examples, the present inventive subject matter seeks to reduce pacing threshold. The present inventive subject matter, in some examples, can reduce electrical resistance about 90% (from ~230Ω to ~20Ω) and change the electrically conductive path, which can result in a reduced pacing threshold. Reduced resistance and pacing threshold can improve patient safety and clinical outcomes. The present inventive subject matter can alter the electrical pathway to excite the endocardium. Some conventional temporary pacing devices utilize electrical pathways through a high electrical resistance coil (~230Ω) and the gap between coil wires to the endocardium. In other words, in some examples, the electrical energy conducted to the endocardium is a combination of electrical energy from the high resistance coil itself and electrical energy from the core wire through the gap between coil wires. Furthermore, experimental data shows that the high electrical resistance coil can block the electrical energy from the core wire. In contrast, the present inventive subject matter utilizes an electrical pathway to the endocardium through a low electrical resistance core wire (8Ω) and pacing coil. In some examples, the core wire and the pacing coil can be welded together to create the electrode and electrical pathway, thereby reducing electrical resistance and fully utilizing the electric energy from the core wire. In other words, in some examples, the electrical energy is directly conducted from the core wire to the coil and then to the endocardium. In this way, the coil does not block the electrical energy from the core wire, and the combined electrical resistance of the core wire and pacing coil is approximately 20Ω.

The present inventive subject matter, in some examples, includes a fixed-dimension electrode at the distal end of the guidewire, which, in some cases, can significantly reduce the risk of the patient's left ventricle blood being "cooked" by the guidewire while also maintaining all mechanical performance of conventional guidewires. In some examples, the present inventive subject matter can reduce the system impedance, in some cases, by more than 50%, or even 80%. High system impedance corresponds to low pacing efficiency. In some examples, the present inventive subject matter can allow for the use of one or more lubricious materials to coat or jacket the core wire, for instance, as the insulation layer. Lubricious materials can significantly reduce the friction force between coil and core wire, thereby allowing an operator to more easily load the coil over the core wire.

In some examples, the present inventive subject matter includes a direct electrical contact at the guidewire proximal end (connector) that can significantly reduce the chances of intermittent or no pacing, thereby improving clinical outcomes. The present inventive subject matter can further improve clinical outcomes by reducing pacing energy loss from the guidewire body, resulting in a lower pacing threshold and leading to better and safer pacing. In some examples, the present inventive subject matter includes an insulation ring at the proximal end of the coil that stops the flow of electrical current to the guidewire coil, thereby limiting the electrical energy lost from the guidewire body. In some examples, the present inventive subject matter allows for the meeting of the 50 kΩ insulation requirement by blocking the electric current from the connector to the guidewire body. Because no electrical current flows to the guidewire coil, the electrical resistance between connector and the guidewire body is greater than 50 kΩ.

Figure 2:
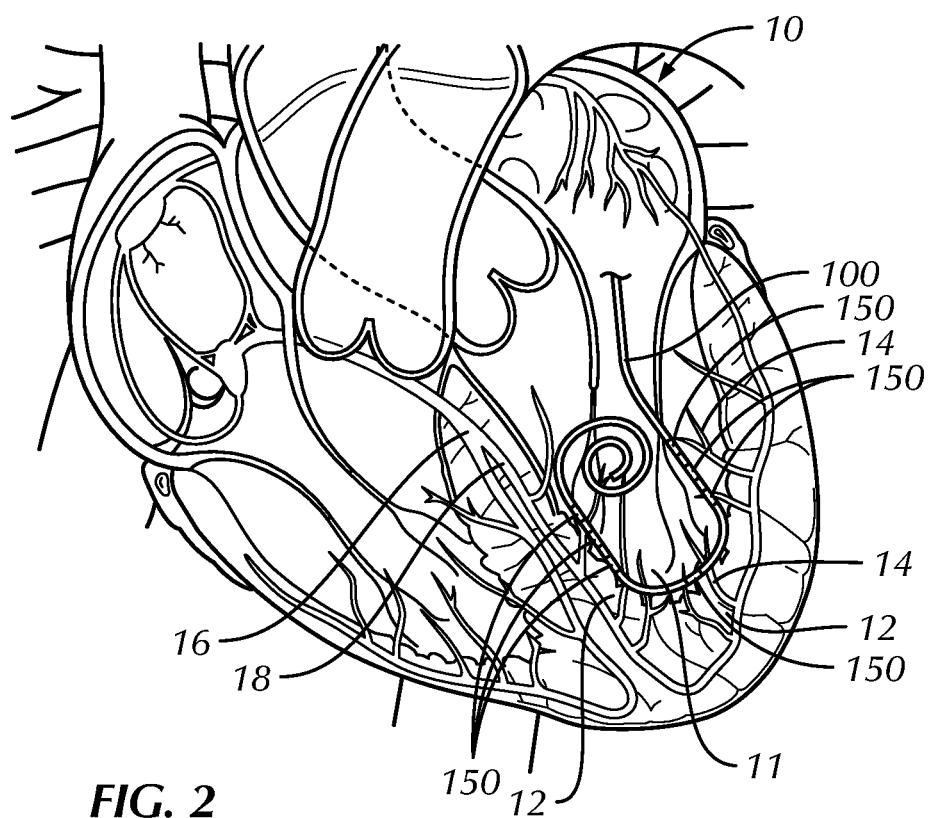
FIG. 2 is a cross-sectional view of a heart having the guidewire of FIG. 1 disposed within the heart.

Referring to FIGS. 1 and 2, in some examples, a guidewire 100 is configured for temporary pacing of tissue, including, but not limited to, tissue 12 of a heart 10 or other organ. In some examples, the guidewire 100 includes an elongate body 102 having a guidewire length extending from a guidewire proximal end to a guidewire distal end 106. In some examples, the elongate body 102 is shaped to enable the guidewire 100 to be maneuvered into a particular location within a patient and constrained within the location. In some examples, the elongate body 102 is shaped to enable the guidewire 100 to be maneuvered into the heart 10 of the patient. The elongate body 102 of the guidewire 100, in some examples, includes a pigtail-shaped portion 102A configured to anchor the guidewire 100 within the heart 10. In some examples, the pigtail-shaped portion 102A inhibits the guidewire 100 from slipping out of a ventricle 11 of the heart 10 and/or slipping through or damaging a heart valve. In some examples, the elongate body 102 further includes a J-shaped portion 102B configured to extend toward and be located proximate to the tissue 12 of the heart 10, such as, for instance, the endocardium. In some examples, the J-shaped portion 102B is configured to be disposed within the ventricle 11 of the heart 10 and press against an interior wall of the ventricle 11 to constrain the guidewire 100 within the ventricle 11 and, thereby, anchor at least a portion of the guidewire 100 within the heart 10. In some examples, the J-shaped portion 102B of the guidewire 100 is disposed proximate the guidewire distal end 106. In further examples, with the J-shaped portion 102B of the elongate body 102 pressing against the interior wall of the ventricle 11, at least part of the J-shaped portion 102B is urged toward the tissue 12 of the heart 10. In still further examples, with the J-shaped portion 102B of the elongate body 102 pressing against the interior wall of the ventricle 11, at least part of the J-shaped portion 102B is urged into contact with or close to the tissue 12 of the heart 10.

In some examples, the guidewire 100 includes at least one electrode 150 disposed along the guidewire 100. In some examples, the at least one electrode 150 is disposed proximate the guidewire distal end 106. The at least one electrode 150, in some examples, includes an exposed section of metal of the elongate body 102 (for instance, a non-coated section of the elongate body 102). In some examples, the at least one electrode 150 produces a stimulation pulse for stimulation of tissue 12.

In some examples, the at least one electrode 150 is disposed along the J-shaped portion 102B of the elongate body 102 of the guidewire 100. In further examples, the at least one electrode 150 is located on the elongate body 102 such that, when the guidewire 100 is properly positioned within the patient, the at least one electrode 150 is positioned proximate the tissue 12 to be selectively stimulated by the at least one electrode 150. In some examples, the tissue 12 to be selectively stimulated by the at least one electrode 150 is cardiac tissue 12. In some examples, with the guidewire 100 properly positioned within the ventricle 11 of the heart 10 of the patient, the at least one electrode 150 is positioned proximate the tissue 12 to allow for stimulation of one or more heart structures, including, but not limited to, Purkinje fibers 14, the bundle of His 16, and/or the left bundle branch 18.

In some examples, the guidewire 100 can include more than one electrode 150. For instance, in the example shown in FIGS. 1 and 2, the guidewire 100 includes seven electrodes 150. In some examples, the electrodes 150 are all disposed along the J-shaped portion 102B of the elongate body 102 of the guidewire 100. In some examples, all of the electrodes 150 stimulate simultaneously because the same conductive wire of the guidewire 100 connects all of the electrodes 150. In this way, in some examples, one or more of the electrodes 150 of the guidewire 100 can be located within the ventricle 11 of the heart 10 to allow for stimulation of the tissue 12 by at least one of the electrodes 150, to thereby excite one or more of the Purkinje fibers 14, the bundle of His 16, and/or the left bundle branch 18.

In various examples, various configurations of the electrodes 150 are contemplated. For instance, in the example shown in FIGS. 1 and 2, the electrodes 150 are grouped into a group of three electrodes 150 along one side of the J-shaped portion 102B, one electrode 150 at a bottom of the J-shaped portion 102B, and another group of three electrodes 150 along the other side of the J-shaped portion 102B. In this way, with the guidewire 100 properly positioned within the left ventricle 11, at least one of the electrodes 150 is disposed proximate the tissue 12 to allow for stimulation of the tissue 12 and excitation of one or more of the Purkinje fibers 14, the bundle of His 16, and/or the left bundle branch 18. Although the above examples of the guidewire 100 include seven electrodes 150 disposed in a particular configuration along the J-shaped portion 102B, it should be understood that other numbers and configurations of electrodes are contemplated, provided the electrodes are capable of exciting the desired tissue.

Figure 3:
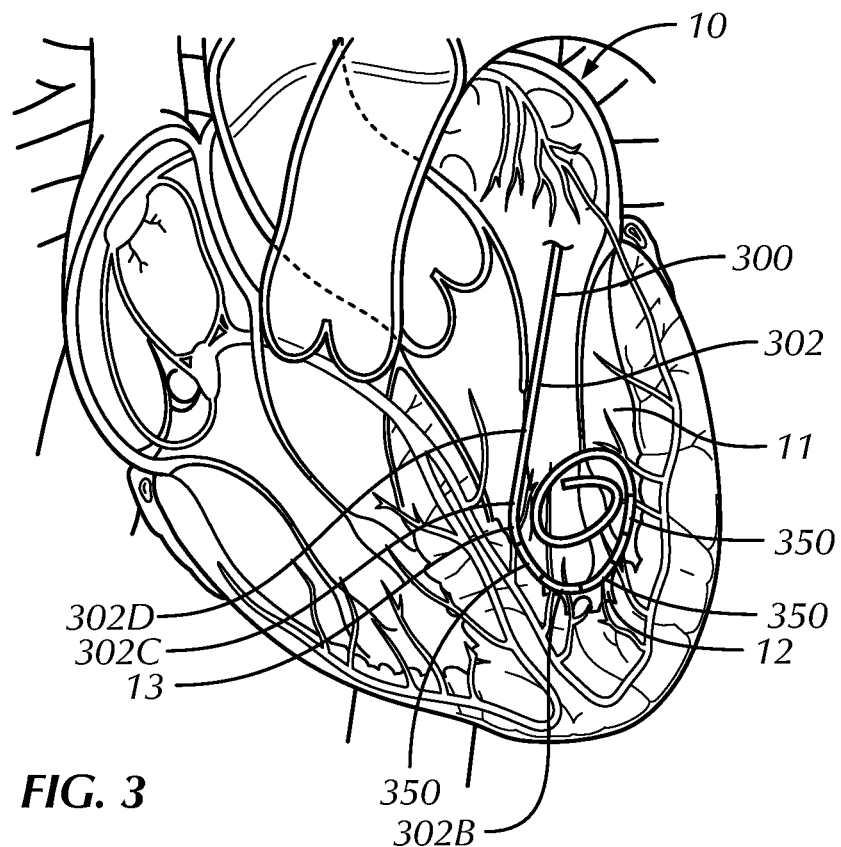
FIG. 3 is a cross-sectional view of a heart having a guidewire in accordance with at least one example of the invention disposed within the heart.

For instance, referring to FIG. 3, in some examples, a guidewire 300 is similar to the guidewire 100 described above except that an elongate body 302 of the guidewire 300 includes three electrodes 350. In some examples, the guidewire 300 includes one electrode 350 along one side of a J-shaped portion 302B, one electrode 350 at a bottom of the J-shaped portion 302B, and one electrode 350 along the other side of the J-shaped portion 302B. In this way, with the guidewire 300 properly positioned within the left ventricle 11 of the heart 10, at least one of the electrodes 350 is disposed proximate the tissue 12 to allow for stimulation of the tissue 12 and excitation of one or more of the Purkinje fibers, the bundle of His, and/or the left bundle branch. In some examples, all of the electrodes 350 stimulate simultaneously because the same conductive wire of the guidewire 300 connects all of the electrodes 350. In some examples, a slight curve 302C is located at a distal end of a straight wire section 302D of the elongate body 302 in order for the guidewire 300 to touch a septal wall 13 of the heart 10 and be close to a heart pacing path. In this way, one or more of the electrodes 350 can easily excite the bundle of His, left bundle branch, and/or Purkinje fibers for efficient pacing of the heart 10.

Figure 4:
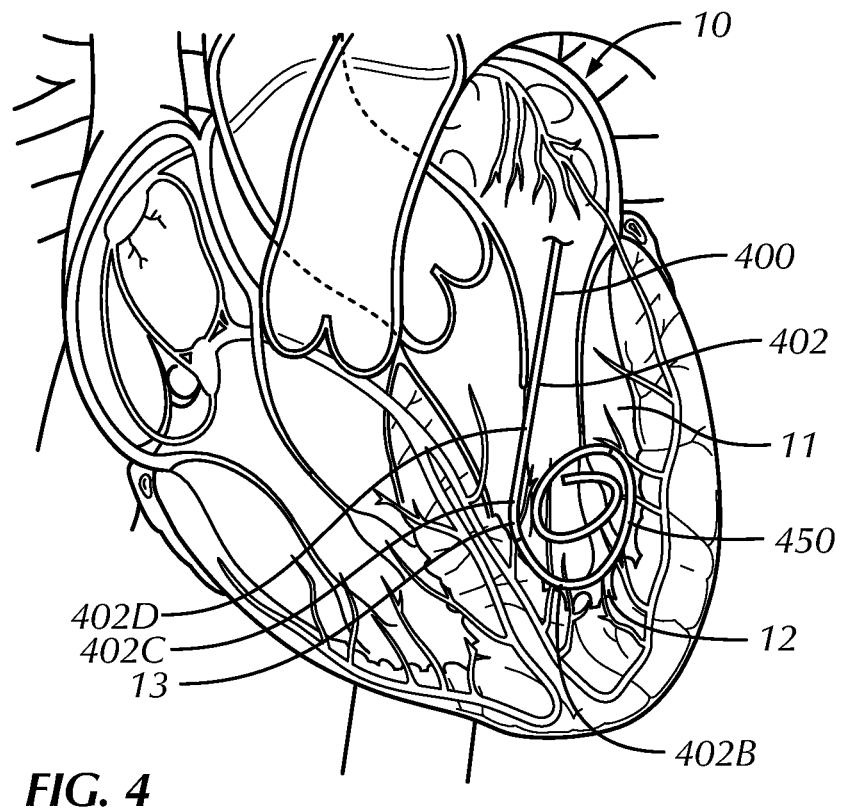
FIG. 4 is a cross-sectional view of a heart having a guidewire in accordance with at least one example of the invention disposed within the heart.

In other examples, referring now to FIG. 4, a guidewire 400 is similar to the guidewires 100, 300 described above except that an elongate body 402 of the guidewire 400 includes one large electrode 450. In some examples, the electrode 450 of the guidewire 400 extends down one side of a J-shaped portion 402B, around a bottom of the J-shaped portion 402B, and up the other side of the J-shaped portion 402B. In this way, with the guidewire 400 properly positioned within the left ventricle 11 of the heart 10, at least a portion of the electrode 450 is disposed proximate the tissue 12 to allow for stimulation of the tissue 12 and excitation of one or more of the Purkinje fibers, the bundle of His, and/or the left bundle branch. In some examples, a slight curve 402C is located at a distal end of a straight wire section 402D of the elongate body 402 in order for the guidewire 400 to touch a septal wall 13 of the heart 10 and be close to a heart pacing path. In this way, the electrode 450 can easily excite the bundle of His, left bundle branch, and/or Purkinje fibers for efficient pacing of the heart 10.

It should be understood that, while guidewires 100, 300, 400 including various configurations of electrodes 150, 350, 450 have been described herein, these configurations of electrodes 150, 350, 450 are not intended to be limiting, such that other numbers and/or configurations of electrodes are also contemplated to stimulate the tissue 12 of the heart 10 and excite various structures of the heart, such as, but not limited to the Purkinje fibers, the bundle of His, and/or the left bundle branch. It should further be understood that the temporary pacing guidewire 100, 300, 400 of the present inventive subject matter, with various examples of electrode 150, 350, 450 configurations, can provide better and more consistent therapeutical/clinical outcomes with lower pacing thresholds than a conventional guidewire.

Referring to FIG. 5, in some examples, a guidewire 500 for temporary pacing of tissue 12 includes an electrode 550. Although shown with a single long electrode 550 similar to the guidewire 400 described above, it should be understood that the guidewire 500 can include any configuration and number of electrodes, including, but not limited to, the configurations and numbers of electrodes 150, 350 of the guidewires 100, 300 shown in FIGS. 1-3. In some examples, with the guidewire 500 properly positioned within the left ventricle 11 of the heart 10, at least a portion of the electrode 550 is disposed proximate the tissue 12 to allow for stimulation of the tissue 12 and excitation of one or more of the Purkinje fibers, the bundle of His, and/or the left bundle branch.

In some examples, the guidewire 500 includes an elongate core wire 510 at least partially disposed within a coil 530, the core wire including a core axis 511 extending along a length of the core wire 510. In some examples, the coil 530 is disposed along at least a portion of the length of the core wire 510, the coil 530 including a coil axis 531 extending along a length of the coil 530. The coil 530, in some examples, is disposed radially outwardly from and around the core wire 510. In some examples, the core axis 511 and the coil axis 531 are substantially aligned. In further examples, the core axis 511 and the coil axis 531 are substantially colinear, such that the core wire 510 and the coil 530 are substantially coaxial.

In some examples, the guidewire 500 includes the electrode 550 disposed along the guidewire 500. In some examples, the guidewire 500 includes insulation 503 disposed along at least a portion of the guidewire 500 around an exterior of the coil 530 with the electrode 550 including a portion of the guidewire 500 without insulation 503. In some examples, the guidewire 500 is configured for temporary pacing of tissue 12, namely tissue 12 of the heart 10, by conducting a stimulation pulse from an external stimulation device along electrical pathways 554 through the coil 530 and out from gaps 532 between windings of the coil 530 to the tissue 12. In some examples, the coil 530 includes relatively high electrical resistance (for instance, around 230Ω), however, which can potentially lead to a relatively high pacing threshold and/or decreased pacing efficiency. In some examples, the electrical energy that is conducted along the electrical pathways 554 to the tissue 12 of the heart 10 is a combination of electrical energy from the high resistance coil 530 itself and electrical energy from the core 510 through the gaps 532 between windings of the coil 530. In some examples, the high resistance coil 530 can block much of the electrical energy from the core 510.

Figure 7:
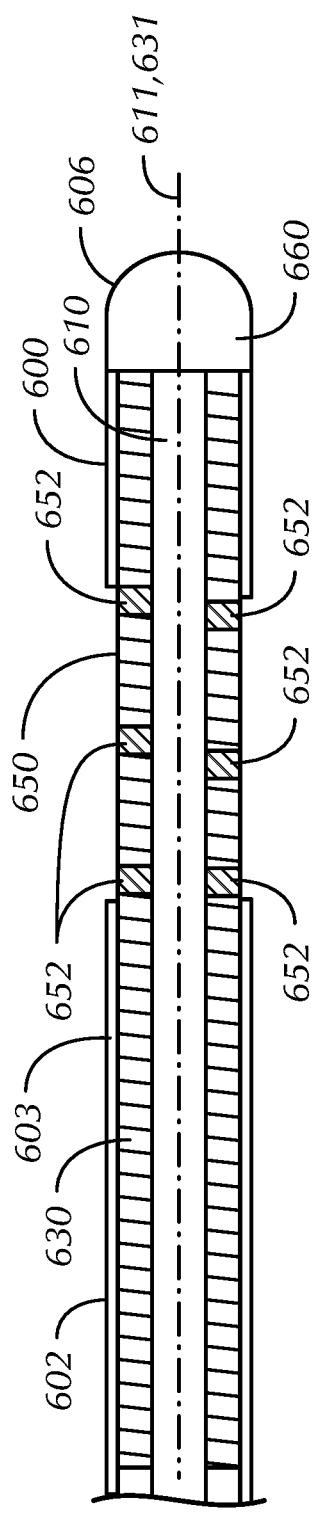
FIG. 7 is a cross-sectional view of a distal portion of a guidewire in accordance with at least one example of the invention.
Figure 8:
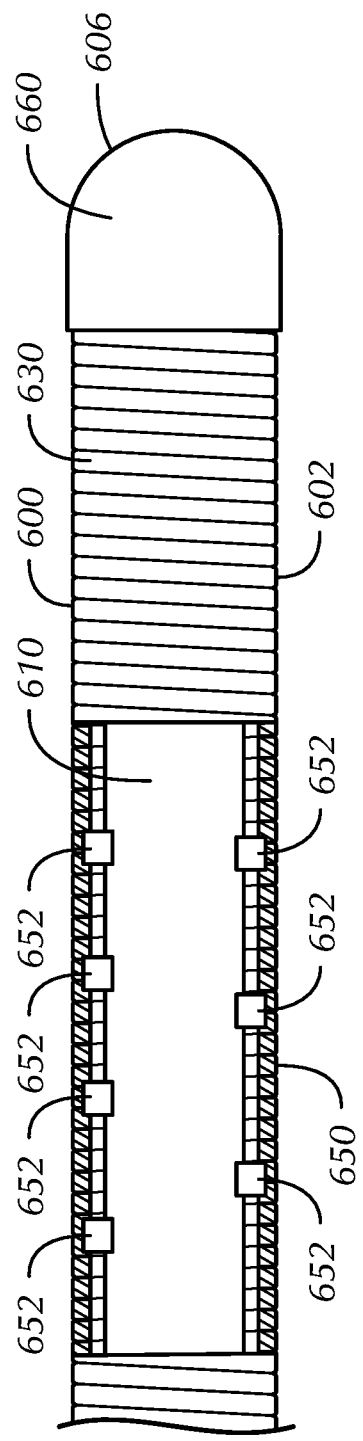
FIG. 8 is a partially broken-away view of a distal portion of a guidewire in accordance with at least one example of the invention.

Referring now to FIGS. 6-8, in some examples, the present inventive subject matter can alter the electrical pathway from the electrical pathways 554 shown in FIG. 5 in order to excite the tissue 12 of the heart 10. In some examples, a guidewire 600 for temporary pacing of tissue 12 includes an electrode 650. Although shown with a single long electrode 650 similar to the guidewires 400, 500 described above, it should be understood that the guidewire 600 can include any configuration and number of electrodes, including, but not limited to, the configurations and numbers of electrodes 150, 350 of the guidewires 100, 300 shown in FIGS. 1-3. In some examples, with the guidewire 600 properly positioned within the left ventricle 11 of the heart 10, at least a portion of the electrode 650 is disposed proximate the tissue 12 to allow for stimulation of the tissue 12 and excitation of one or more of the Purkinje fibers, the bundle of His, and/or the left bundle branch. In some examples, the guidewire 600 includes a tip electrode 660 at a distal end 606 to further facilitate stimulation of the tissue 12 of the heart 10.

In some examples, the guidewire 600 includes an elongate core wire 610 at least partially disposed within a coil 630, the core wire including a core axis 611 extending along a length of the core wire 610. In some examples, the coil 630 is disposed along at least a portion of the length of the core wire 610, the coil 630 including a coil axis 631 extending along a length of the coil 630. The coil 630, in some examples, is disposed radially outwardly from and around the core wire 610. In some examples, the core axis 611 and the coil axis 631 are substantially aligned. In further examples, the core axis 611 and the coil axis 631 are substantially colinear, such that the core wire 610 and the coil 630 are substantially coaxial.

In some examples, the guidewire 600 includes the electrode 650 disposed along the guidewire 600. In some examples, the guidewire 600 includes insulation 603 disposed along at least a portion of the guidewire 600 around an exterior of the coil 630 with the electrode 650 including a portion of the guidewire 600 without insulation 603. In some examples, the coil 630 can be coated (such as, for instance, with at least one of polytetrafluoroethylene (PTFE), fluorinated ethylene propylene (FEP), Pebax© material, polyurethane, or the like) and include no insulation 603 over the coil 630 at the electrode 650. In some examples, the guidewire 600 is configured for temporary pacing of tissue 12, namely tissue 12 of the heart 10, by conducting a stimulation pulse from an external stimulation device along electrical pathways 654 through the core wire 610 and the coil 630 to the tissue 12. In some examples, the electrical pathways 654 pass through the core wire 610, which includes a relatively low electrical resistance (for instance, about 8Ω). In some examples, the core wire 610 and the coil 630 can be welded together at one or more welds 652 at the electrode 650 and create the electrical pathways 654 to reduce electrical resistance and more fully utilize the electric energy from the core wire 610. In some examples, the electrode 650 includes at least one weld 652 between an uninsulated portion of the core wire 610 and an electrode section of the coil 630 to create a lower-resistance path to stimulate the tissue 12. In other words, the electrical energy is directly conducted from the core wire 610 to the coil 630 and then to the tissue 12 of the heart 10, such as, for instance, the endocardium. In this way, in some examples, the welds 652 between the core wire 610 and the coil 630 lessen if not eliminate the possibility of the coil 630 blocking the electrical energy from the core wire 610. In some examples, the combined electrical resistance of the core wire 610 and the coil 630 is approximately 20Ω.

Figure 9:
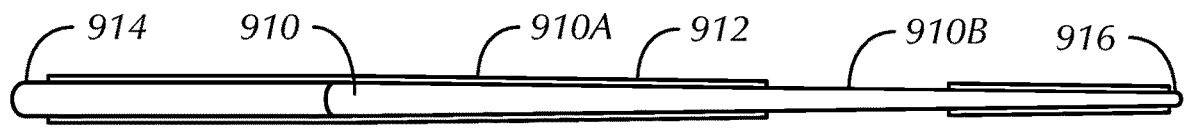
FIG. 9 is a side view of a core wire for a guidewire in accordance with at least one example of the invention.
Figure 10:
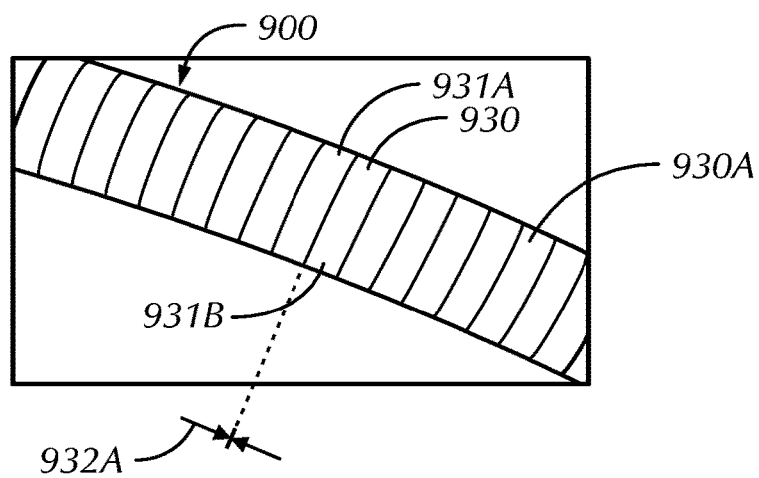
FIG. 10 is a side view of a coil for a guidewire in accordance with at least one example of the invention.
Figure 11:
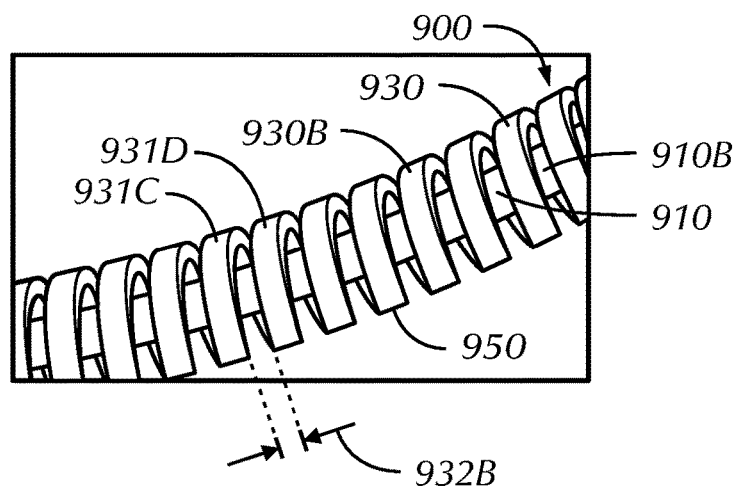
FIG. 11 is a side view of a coil for a guidewire in accordance with at least one example of the invention.
Figure 12C:
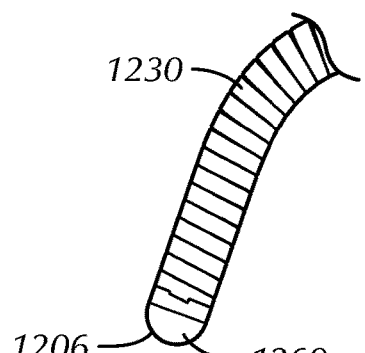
FIGS. 12A-12E are various views of a guidewire in accordance with at least one example of the invention.
Figure 12A:
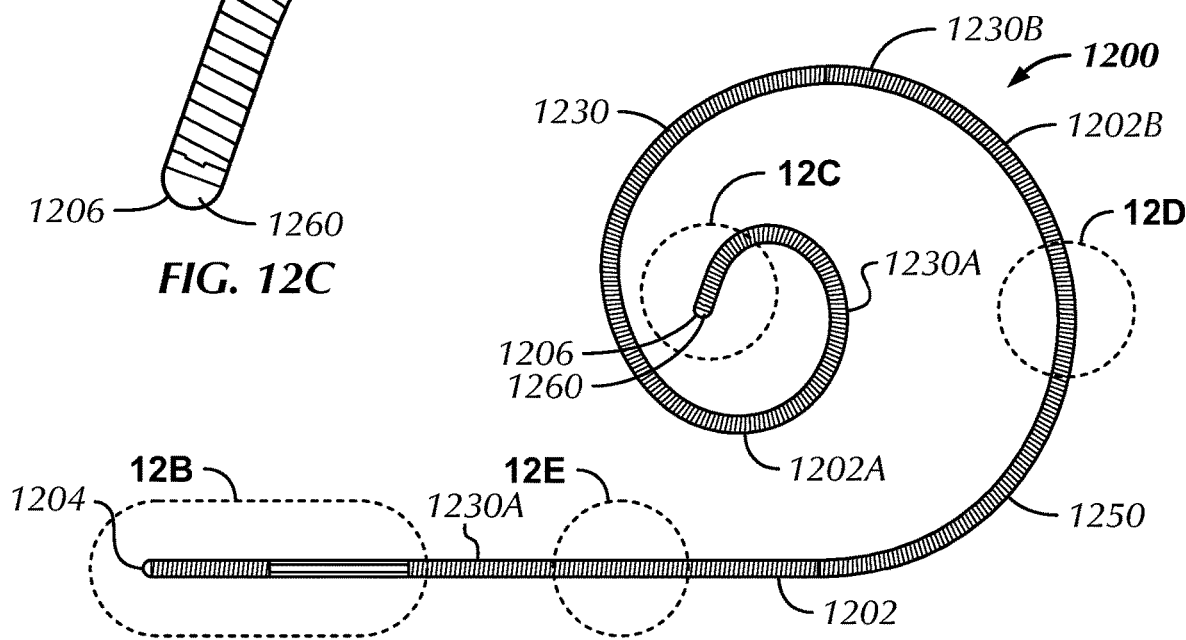
Figure 12B:
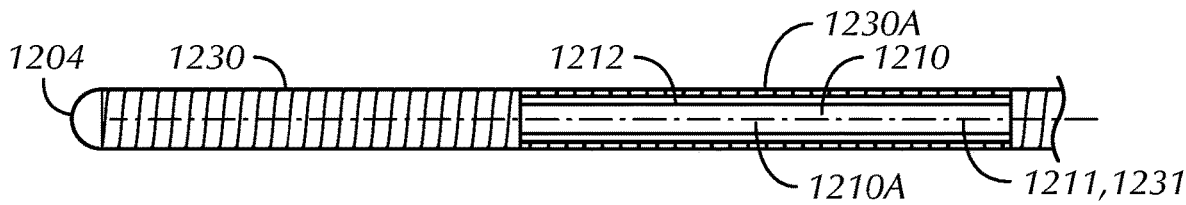
Figure 12D:
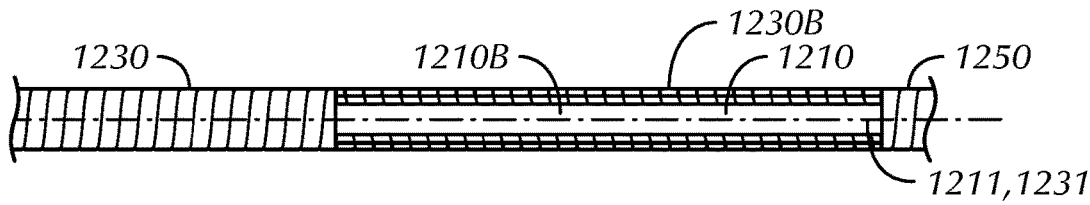
Figure 12E:
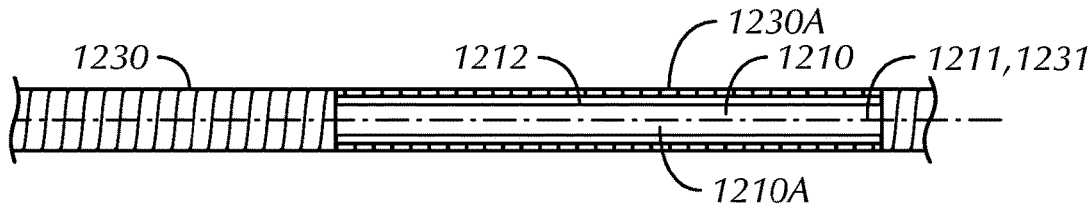

Referring to FIGS. 9-11, in some examples, a guidewire 900 for temporary pacing of tissue can include an elongate core wire 910 disposed within a coil 930. In some examples, the coil 930 is disposed radially outwardly from and around at least a portion of the core wire 910. The core wire 910, in some examples, includes a core proximal end 914, a core distal end 916, and a core length extending from the core proximal end 914 to the core distal end 916. The core wire 910, in some examples, includes insulation 912 disposed around an insulated portion 910A of the core wire 910. In some examples, the coil 930 is disposed along at least a portion of the length of the core wire 910. In some examples, the coil 930 includes a first pitch along at least a first portion 930A of the coil 930. In some examples, the first pitch is such that a first spacing 932A between adjacent windings 931A, 931B of the first portion 930A of the coil 930 is very small, and, in some cases, non-existent, such that the adjacent windings 931A, 931B of the first portion 930A of the coil 930 are touching or at least very close to one another.

In some examples, the guidewire 900 includes at least one electrode 950 disposed along the guidewire 900. In some examples, the at least one electrode 950 includes an uninsulated portion 910B of the core wire 910 disposed within an electrode section 930B of the coil 930. In some examples, with the exception of the uninsulated portion 910B of the core wire 910 within the electrode section 930B of the coil 930, the core wire 910 includes the insulation 912. In some examples, the electrode section 930B of the coil 930 includes a second pitch, wherein the second pitch is greater than the first pitch of the first portion 930A of the coil 930, such that a second spacing 932B between adjacent windings 931C, 931D of the electrode section 930B of the coil 930 is configured to allow a stimulation pulse to travel from the uninsulated portion 910B of the core wire 910, through the spacing 932B between the adjacent windings 931C, 931D of the electrode section 930B, and to tissue in order to stimulate the tissue.

In some examples, the coil 930 of the electrode section 930B having the second pitch includes a distance 932B between adjacent windings of the coil 930 that is greater than a distance 932A between adjacent windings of the first portion 930A of the coil 930 having the first pitch. In some examples, the second pitch of the electrode section 930B exposes the uninsulated portion 910B of the core wire 910 beneath the electrode section 930B of the coil 930 as the at least one electrode 950. The coil 930, in some examples, can be coated with PTFE. In other examples, the coil 930 is not coated.

Referring now to FIGS. 12A-12E, a guidewire 1200 for temporary pacing of tissue includes an elongate body 1202 having a guidewire proximal end 1204, a guidewire distal end 1206, and a guidewire length extending from the guidewire proximal end 1204 to the guidewire distal end 1206. In some examples, the elongate body 1202 is shaped to enable the guidewire 1200 to be maneuvered into a particular location within a patient and constrained within the location. In some examples, the elongate body 1202 is shaped to enable the guidewire 1200 to be maneuvered into the heart 10 of the patient. The elongate body 1202 of the guidewire 1200, in some examples, includes a pigtail-shaped portion 1202A configured to anchor the guidewire 1200 within the heart. In some examples, the pigtail-shaped portion 1202A inhibits the guidewire 1200 from slipping out of a ventricle 11 of the heart 10 and/or slipping through or damaging a heart valve. In some examples, the elongate body 1202 further includes a J-shaped portion 1202B configured to extend toward and be located proximate to the tissue of the heart, such as, for instance, the endocardium. In some examples, the J-shaped portion 1202B is configured to be disposed within the ventricle of the heart and press against an interior wall of the ventricle to constrain the guidewire 1200 within the ventricle and, thereby, anchor at least a portion of the guidewire 1200 within the heart. In some examples, the J-shaped portion 1202B of the guidewire 1200 is disposed proximate the guidewire distal end 1206. In further examples, with the J-shaped portion 1202B of the elongate body 1202 pressing against the interior wall of the ventricle, at least part of the J-shaped portion 1202B is urged toward the tissue of the heart. In still further examples, with the J-shaped portion 1202B of the elongate body 1202 pressing against the interior wall of the ventricle, at least part of the J-shaped portion 1202B is urged into contact with or close to the tissue of the heart.

In some examples, the guidewire 1200 includes an elongate core wire 1210. In some examples, the core wire 1210 includes a core proximal end, a core distal end, and a core length extending from the core proximal end to the core distal end. The core wire 1210, in some examples, includes a core axis 1211 along the length of the core wire 1210. In some examples, the core wire 1210 can be formed from a solid core wire. In other examples, the core wire 1210 can be formed from a tube or hypotube. In still other examples, the core wire 1210 can be partially formed from a solid core wire and partially formed from a tube or hypotube. In some examples, a diameter or cross-sectional size and/or shape of the core wire 1210 can vary along the length of the core wire 1210. In some examples, at least a portion 1210A of the core wire 1210 is insulated. That is, in some examples, the core wire 1210 includes insulation 1212 surrounding at least the portion 1210A of the core wire 1210.

In some examples, a coil 1230 is disposed along at least a portion of the length of the core wire 1210. The coil 1230, in some examples, includes a coil length and a coil axis 1231 along the length of the coil 1230. In some examples, the coil 1230 includes a first pitch along at least a first portion 1230A of the coil 1230. In some examples, the first pitch of the first portion 1230A of the coil 1230 is similar to the first pitch of the first portion 930A of the coil 930 described above and shown in FIG. 10. In some examples, the coil 1230 is disposed radially outwardly from and around the core wire 1210. In further examples, the core axis 1211 and the coil axis 1231 are substantially aligned. In other examples, the core axis 1211 and the coil axis 1231 are coaxial.

In some examples, the guidewire 1200 includes at least one electrode 1250 disposed along the guidewire 1200. In some examples, the at least one electrode 1250 includes an uninsulated portion 1210B of the core wire 1210 disposed within an electrode section 1230B of the coil 1230. In some examples, the electrode section 1230B of the coil 1230 includes a second pitch similar to the second pitch of the electrode section 930B of the coil 930 described above and shown in FIG. 11. In some examples, the second pitch is greater than the first pitch, such that a spacing between adjacent windings of the electrode section 1230B of the coil 1230 is configured to allow a stimulation pulse to travel from the uninsulated portion 1210B of the core wire 1210, through the spacing between the adjacent windings of the electrode section 1230B, and to the tissue in order to stimulate the tissue. In some examples, the core wire 1210 can be welded to the coil 1230 in a similar way to that which is described herein with respect to the guidewire 600 and shown in FIGS. 6-8, either instead of or in addition to the electrode portion 1230B of the coil 1230 including the second pitch to form the spacing between adjacent windings. In some examples, the electrode 1250 includes at least one weld between the uninsulated portion 1210B of the core wire 1210 and the electrode section 1230B of the coil 1230 to create a lower-resistance path to stimulate the tissue. In some examples, the core wire 1210 is insulated along the length of the core wire 1210 except at a location (for instance, the uninsulated portion 1210B) of the at least one electrode 1250.

In some examples, the guidewire includes a distal electrode 1260 disposed at the guidewire distal end 1206. In this way, the guidewire 1200 can utilize one or both of the at least one electrode 1250 and the distal electrode 1260 to stimulate the tissue of the heart and excite one or more of the Purkinje fibers, the bundle of His, and/or the left bundle branch.

In some examples, the coil 1230 can be coated with PTFE. In other examples, the coil 1230 is not coated. The guidewire 1200, in some examples, can include an insulation jacket around at least a portion of the guidewire 1200. In some examples, the guidewire 1200 includes an insulation jacket around a majority of the guidewire 1200 but includes no insulation jacket around the guidewire 1200 at the one or more electrodes 1250.

Figure 13:
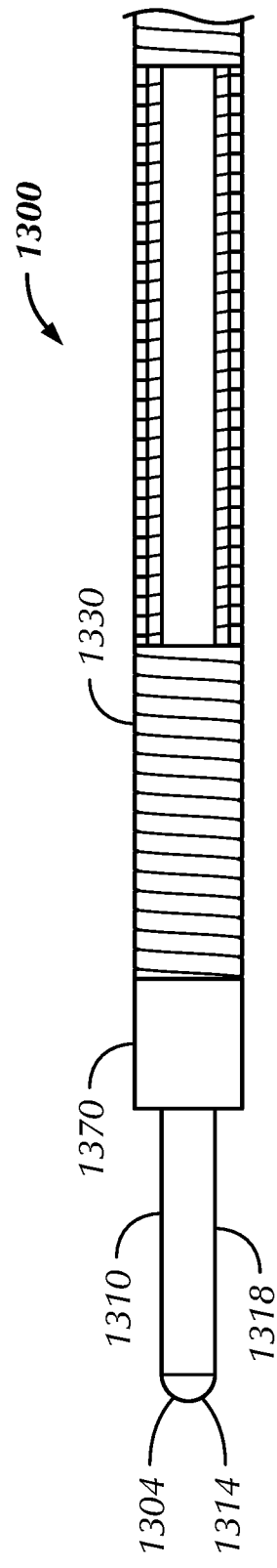
FIG. 13 is a partially broken-away view of a proximal portion of a guidewire in accordance with at least one example of the invention.
Figure 14:
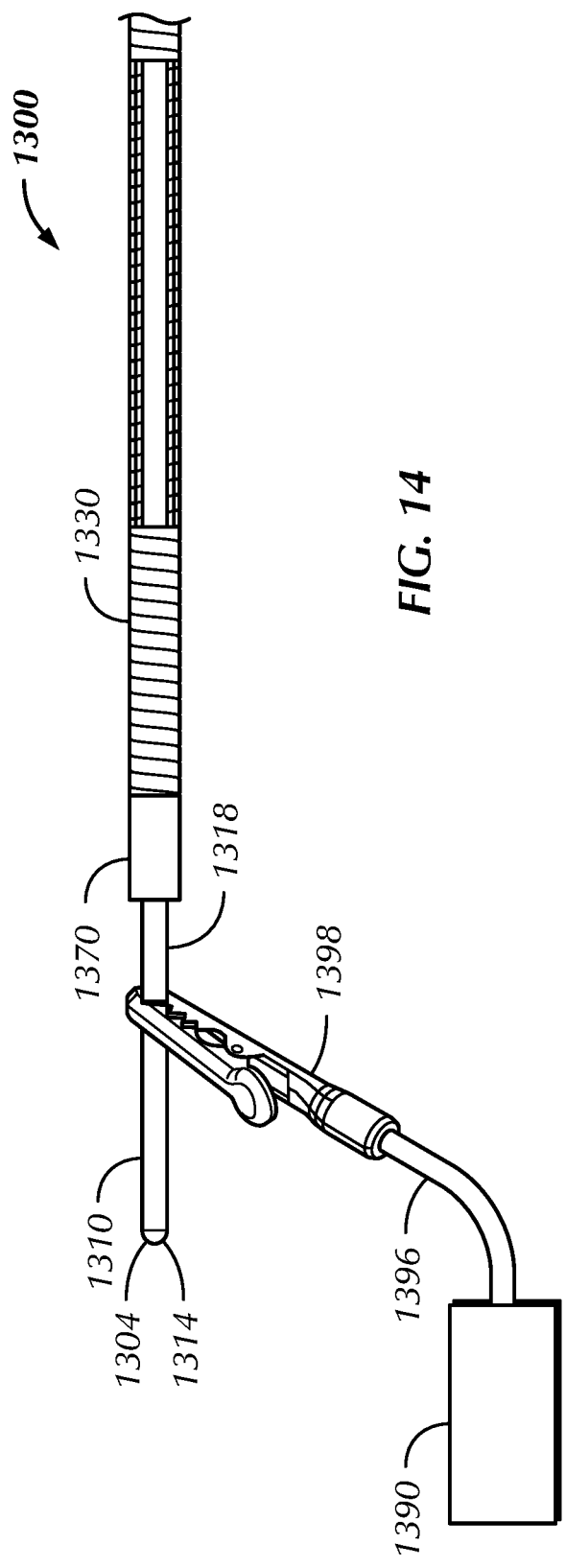
FIG. 14 is a partially broken-away view of a proximal portion of a guidewire in accordance with at least one example of the invention.

Referring now to FIGS. 13 and 14, a proximal guidewire end 1304 of a guidewire 1300 for temporary pacing of tissue includes a connector 1318 for selectively coupling to an external stimulation device 1390. In some examples, the guidewire 1300 includes a core wire 1310 at least partially surrounded by a coil 1330. In various examples, the guidewire 1300 is similar to one or more of the guidewires 100, 300, 400, 500, 600, 900, 1200 described herein. In some examples, the features of the guidewire 1300 and, specifically, the proximal guidewire end 1304 of the guidewire 1300 described herein can be used and combined with each of the guidewires 100, 300, 400, 500, 600, 900, 1200.

In some examples, the guidewire proximal end 1304 includes a connector 1318 configured to electrically couple an external stimulation device 1390 to the core wire 1310. In some examples, the external stimulation device 1390 is configured to provide a stimulation pulse to be delivered by the at least one electrode (for instance, the electrode 150, 350, 450, 550, 650, 950, 1250) in order to stimulate tissue. In some examples, the connector 1318 includes a core proximal end 1314 extending from within the guidewire 1300. That is, in some examples, the core wire 1310 extends proximally from the coil 1330 a distance to allow selective electrical coupling to the external stimulation device 1390. In some examples, at least a portion of the core proximal end 1314 and/or the connector 1318 is uninsulated to ensure a proper connection to the external stimulation device 1390. In some examples, the guidewire 1300 includes an insulation ring 1370 electrically insulating the coil 1330 from the core proximal end 1314. In some examples, the insulation ring 1370 is disposed at the proximal end of the coil 1330 to insulate the connector 1318 from the coil 1330. In some examples, the connector 1318 includes a bare metal shaft. In some examples, the insulation ring 1370 between the connector 1318 and the coil 1330 inhibits electrical current from flowing to the coil 1330 from the guidewire proximal end 1304. In some examples, the insulation ring 1370 is located before the proximal end of the coil 1330 to block the electrical current from the guidewire proximal end 1304 and the connector 1318 to the coil 1330. In this way, it is possible to meet the 50 kΩ insulation requirement by blocking the electric current from the connector 1318 to the coil 1330. Since no electrical current flows to the coil 1330, the electrical resistance between the connector 1318 and the coil 1330 is greater than 50 kΩ.

In some examples, the external stimulation device 1390 includes an alligator clip 1398 coupled to the external stimulation device 1390 with a conductor 1396, the alligator clip 1398 is configured to selectively electrically couple to the connector 1318 of the guidewire 1300 in order to provide the stimulation pulse to be delivered by the at least one electrode (for instance, the electrode 150, 350, 450, 550, 650, 950, 1250) for the stimulation of the tissue. In other examples, electrical coupling devices other than an alligator clip 1398 can be used to couple the external stimulation device 1390 to the connector 1318 of the guidewire 1300, such as, but not limited to, a socket, a ring, a bare wire, or the like.

In this way, in some examples, the connector 1318 of the guidewire 1300 allows for relatively easy and relatively quick electrical coupling of the guidewire 1300 to the external stimulation device 1390 when it is desired to temporarily pace tissue, for instance, cardiac tissue, using the guidewire 1300. With the external stimulation device 1390 coupled to the connector 1318, electrical current passes from the external stimulation device 1390 to the connector 1318 to provide one or more stimulation pulses for delivery by the at least one electrode (for instance, the electrode 150, 350, 450, 550, 650, 950, 1250) of the guidewire 1300 in order to stimulate tissue, such as, for instance, cardiac tissue.

The present inventors have recognized various advantages of the subject matter described herein. The present inventors have recognized, among other things, that the present subject matter can be used to provide a guidewire for consistent temporary stimulation of tissue, such as, but not limited to, temporary pacing of cardiac tissue. In various examples, the present subject matter is advantageous in that it provides a guidewire with multiple electrodes to allow for at least one electrode to touch, or otherwise get close enough to, a heart pacing path and, therefore, consistently excite a heart conducting nerve. Also, the present subject matter is advantageous in that it allows for a guidewire that can provide a consistent and relatively low impedance pathway between an external stimulation device. The present subject matter can be used to provide a guidewire that can allow for more reliable temporary pacing in order to facilitate more favorable clinical outcomes. While various advantages of the example systems are listed herein, this list is not considered to be complete, as further advantages may become apparent from the description and figures presented herein.

Although the subject matter of the present patent application has been described with reference to various examples, workers skilled in the art will recognize that changes can be made in form and detail without departing from the scope of the subject matter recited in the below claims.

The above Detailed Description includes references to the accompanying drawings, which form a part of the Detailed Description. The drawings show, by way of illustration, specific examples in which the present apparatuses and methods can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "about" and "approximately" or similar are used to refer to an amount that is nearly, almost, or in the vicinity of being equal to a stated amount.

In the appended claims, the terms "including" and "in which" are used as the plain-English equivalents of the respective terms "comprising" and "wherein." Also, in the following claims, the terms "including" and "comprising" are open-ended, that is, an apparatus or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

The invention claimed is:

1. A guidewire for temporary pacing of tissue, the guidewire including a guidewire proximal end, a guidewire distal end, and a guidewire length extending from the guidewire proximal end to the guidewire distal end, the guidewire comprising:
an elongate core wire, the core wire including a core proximal end, a core distal end, and a core length extending from the core proximal end to the core distal end, the core wire including a core axis along the length of the core wire;
a coil disposed along at least a portion of the length of the core wire, the coil including a coil length and a coil axis along the length of the coil, the coil including a first pitch along at least some of the length of the coil, the coil being disposed radially outwardly from and around the core wire, wherein the core axis and the coil axis are substantially aligned; and
at least one electrode disposed along the guidewire, the at least one electrode including an uninsulated portion of the core wire disposed within an electrode section of the coil, the electrode section of the coil including a second pitch, wherein the second pitch is greater than the first pitch, such that a spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

2. The guidewire of claim 1, wherein the core wire includes insulation along at least a portion of the core wire other than the uninsulated portion.

3. The guidewire of claim 2, wherein the core wire is insulated along the length of the core wire except at the uninsulated portion of the core wire disposed at a location of the at least one electrode.

4. The guidewire of claim 1, wherein the coil of the electrode section having the second pitch includes a distance between adjacent windings of the coil that is greater than a distance between adjacent windings of the coil having the first pitch.

5. The guidewire of claim 1, wherein the guidewire includes a J-shaped portion proximate the guidewire distal end.

6. The guidewire of claim 5, wherein the at least one electrode is located on the J-shaped portion.

7. The guidewire of claim 1, wherein the at least one electrode includes two or more electrodes.

8. The guidewire of claim 1, wherein the coil includes a coating around at least part of the coil.

9. The guidewire of claim 1, wherein the at least one electrode includes at least one weld between the uninsulated portion of the core wire and the electrode section of the coil to create a lower-resistance path to stimulate the tissue.

10. The guidewire of claim 1, wherein the guidewire proximal end includes a connector configured to electrically couple an external stimulation device to the core wire, the external stimulation device being configured to provide the stimulation pulse to be delivered by the at least one electrode in order to stimulate the tissue.

11. The guidewire of claim 10, wherein the connector includes the core proximal end extending from within the guidewire, at least a portion of the core proximal end being uninsulated.

12. The guidewire of claim 11, wherein the connector includes an insulation ring electrically insulating the coil from the core proximal end.

13. A guidewire for temporary pacing of tissue, the guidewire including a guidewire proximal end, a guidewire distal end, and a guidewire length extending from the guidewire proximal end to the guidewire distal end, the guidewire comprising:
an elongate core wire, the core wire including a core proximal end, a core distal end, and a core length extending from the core proximal end to the core distal end, the core wire including a core axis along the length of the core wire;
a coil disposed along at least a portion of the length of the core wire, the coil including a coil length and a coil axis along the length of the coil, the coil including a first pitch along at least some of the length of the coil, the coil being disposed radially outwardly from and around the core wire, wherein the core axis and the coil axis are substantially aligned; and
at least one electrode disposed along the guidewire, the at least one electrode including an uninsulated portion of the core wire disposed within an electrode section of the coil, the electrode section of the coil including a second pitch greater than the first pitch, wherein the coil of the electrode section having the second pitch includes a distance between adjacent windings of the coil that is greater than a distance between adjacent windings of the coil having the first pitch, such that a spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

14. The guidewire of claim 13, wherein the core wire includes insulation along at least a portion of the core wire, the core wire at least being uninsulated at the uninsulated portion of the core wire disposed at a location of the at least one electrode.

15. The guidewire of claim 13, wherein the at least one electrode includes two or more electrodes.

16. The guidewire of claim 13, wherein the at least one electrode includes at least one weld between the uninsulated portion of the core wire and the electrode section of the coil to create a lower-resistance path to stimulate the tissue.

17. The guidewire of claim 13, wherein the guidewire proximal end includes a connector configured to electrically couple an external stimulation device to the core wire, the external stimulation device being configured to provide the stimulation pulse to be delivered by the at least one electrode in order to stimulate the tissue.

18. The guidewire of claim 17, wherein the connector includes:
the core proximal end extending from within the guidewire, at least a portion of the core proximal end being uninsulated; and
an insulation ring electrically insulating the coil from the core proximal end.

19. A guidewire for temporary pacing of tissue, the guidewire including a guidewire proximal end, a guidewire distal end, and a guidewire length extending from the guidewire proximal end to the guidewire distal end, the guidewire comprising:
an elongate core wire, the core wire including a core proximal end, a core distal end, and a core length extending from the core proximal end to the core distal end, the core wire including a core axis along the length of the core wire, wherein the core wire includes insulation along at least a portion of the core wire;

a coil disposed along at least a portion of the length of the core wire, the coil including a coil length and a coil axis along the length of the coil, the coil including a first pitch along at least some of the length of the coil, the coil being disposed radially outwardly from and around the core wire, wherein the core axis and the coil axis are substantially aligned; and two or more electrodes disposed along the guidewire, each of the electrodes including an uninsulated portion of the core wire disposed within an electrode section of the coil, the electrode section of the coil including a second pitch greater than the first pitch, the coil of the electrode section having the second pitch including a distance between adjacent windings of the coil that is greater than a distance between adjacent windings of the coil having the first pitch, such that a spacing between adjacent windings of the electrode section of the coil is configured to allow a stimulation pulse to travel from the uninsulated portion of the core wire, through the spacing between the adjacent windings of the electrode section, and to the tissue in order to stimulate the tissue.

20. The guidewire of claim 19, wherein each of the two or more electrodes includes at least one weld between the uninsulated portion of the core wire and the electrode section of the coil to create a lower-resistance path to stimulate the tissue.

* * * * *